March 15, 1932.  J. W. McADAM  1,849,430
CLOSED AUTOMOBILE BODY
Filed Aug. 13, 1929   2 Sheets-Sheet 2
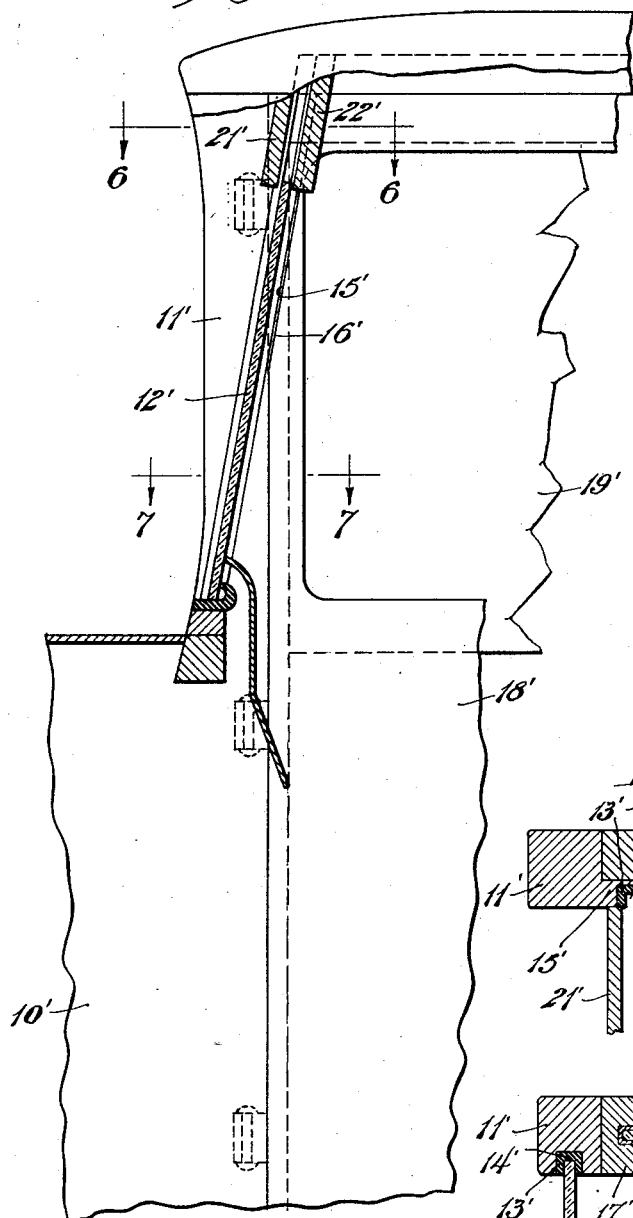
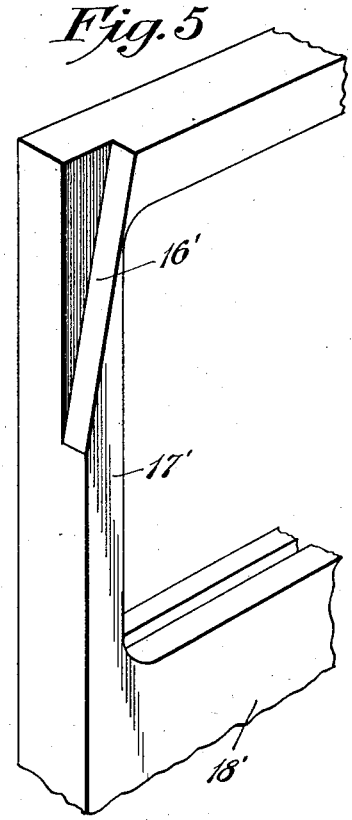
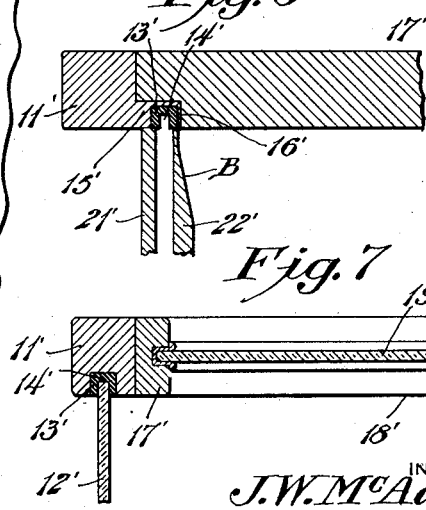
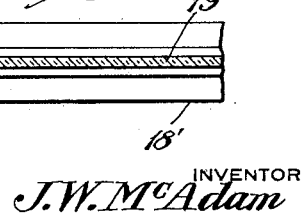
INVENTOR
J. W. McAdam
BY
Siggers + Adams
ATTORNEYS Patented Mar. 15, 1932

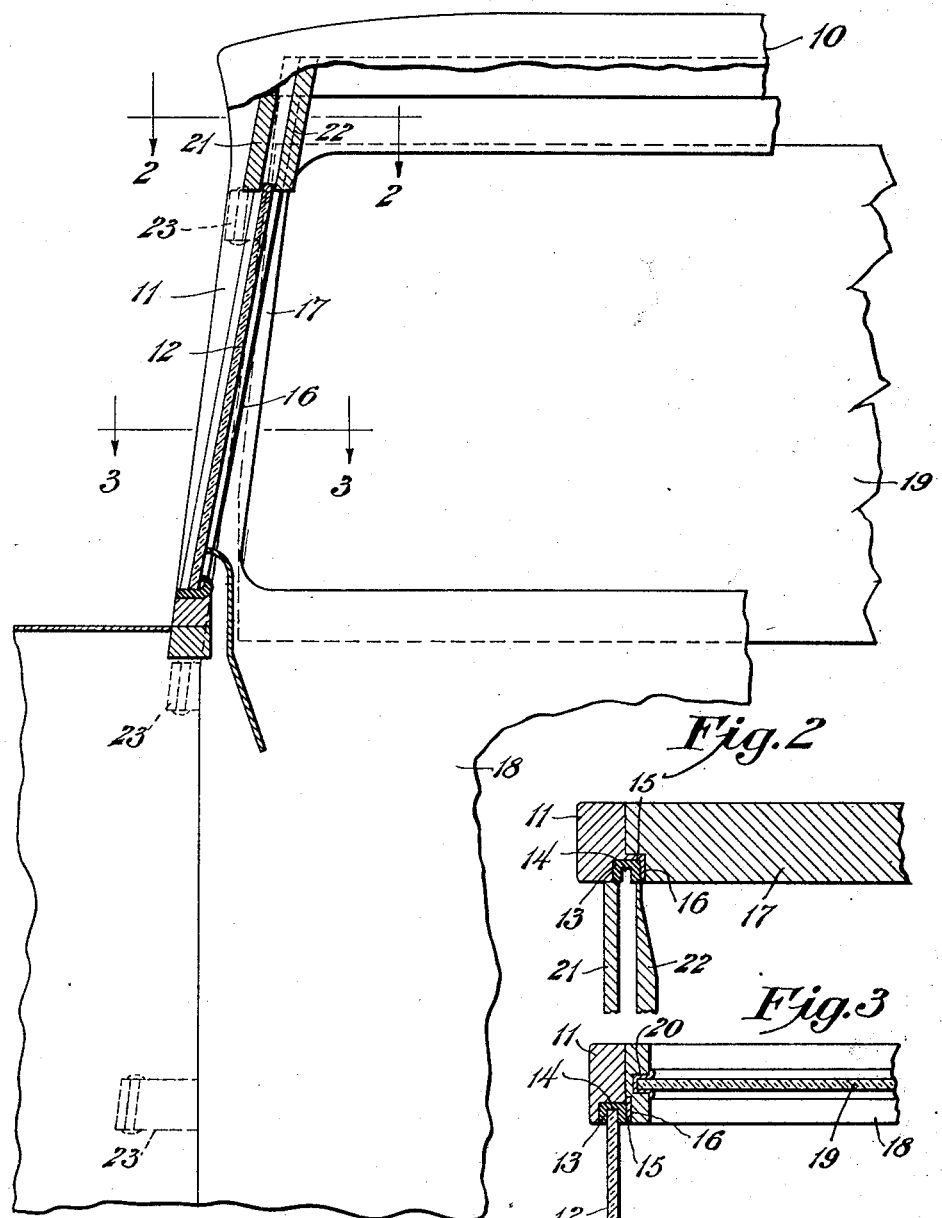

1,849,430

UNITED STATES PATENT OFFICE

JOSIAH W. McADAM, OF VANCOUVER, BRITISH COLUMBIA, CANADA

CLOSED AUTOMOBILE BODY

Application filed August 13, 1929. Serial No. 385,488.

This invention relates to closed automobile bodies having non-glare windshields, and among other objects, aims to provide an improved corner post construction to suit a wide variety of body designs having provision to receive the windshield glass mounted at the proper angle of inclination. Another and incidental feature of the invention involves improved door jambs and window frames so constructed and arranged as to contribute to a neat appearance and, at the same time permit the doors to be hinged vertically at their forward edges or more nearly in a vertical line than has heretofore been considered possible or practicable. In general, the invention involves important improvements on my Patent No. 1,671,433, the principal aim being to provide for clear vision without necessitating expensive and complex changes in a wide variety of designs of modern automobile bodies.

In the accompanying drawings, wherein two illustrative examples of the invention are shown, Fig. 1 is a fragmentary side elevation of one form of body showing the windshield in cross section;

Figs. 2 and 3 are sectional views taken on the lines 2—2 and 3—3 respectively in Fig. 1;

Fig. 4 is a view similar to Fig. 1 but showing one embodiment of the invention applied to a different style of body;

Fig. 5 is a fragmentary perspective view of the door shown in Fig. 4, and

Figs. 6 and 7 are sectional views taken on the lines 6—6 and 7—7 respectively of Fig. 4.

As has been intimated, the provision of inclined front posts or pillars to afford the necessary non-glare slant for the ordinary windshields, involves a great many drawbacks, especially in connection with the sliding windows in the front doors. Also, such a change would involve expensive changes in the body design if the pillars are intended to be vertical like those in a great majority of the present closed cars. In some closed bodies extra triangular windows are built in to provide straight or vertical door-jambs and avoid wide blind spots at the front. This invention aims to provide a body front embodying a non-glare windshield that is adaptable to nearly every popular body design without expensive and complicated alterations.

Referring particularly to Figs. 1, 2 and 3, the non-glare windshield is there shown as being applied to a closed body 10 having front inclined corner posts or pillars 11, the arrangement being such as to provide a minimum width of the corner assembly and thereby obviate the objectionable blind spot. Herein, the corner post 11 is only slightly inclined upwardly and rearwardly, but the windshield 12, which may be of the sliding or swinging type, is slanted across the inside of the post so that its angle of inclination is much greater than that of the post, the idea being to get the necessary non-glare slant without increasing the slant of the corner posts.

In this instance, the windshield glass is of the sliding type and is mounted in window grooves or guides 13 having channel-shaped tracks 14, the assembly being of the well known VV-type. As will be seen in Fig. 1, the tracks are slanted from bottom to top across the inner face of each corner post from near the front edge at the bottom to a point near the rear edge at the top. The inside width of the corner post or pillar at the bottom is considerably narrower than it is at the top, the idea being top rovide a sufficient width at the top to permit the necessary inclination of the glass. In this instance, the inner upper portions of the corner posts present offset projections 15 extending upwardly and rearwardly to provide the necessary width at the tops. These projections are conveniently produced in wooden posts by cutting beveled rabbets 16. However, in case the posts are made of metal such as structural elements, they may be so fabricated as to provide the offsets. The idea of the offsets is to enable the combined width of the window frame 17 in the door 18 and the corner posts 11 to be made uniform both inside and outside from the bottom to the top and to avoid a prohibitive inclination of the window frame.

Again referring to Fig. 1, it will be noted that the front edge of the window frame 17 is tapered upwardly and rearwardly to correspond with the slant of the offset projection, the door being rabbeted to fit against the corner post and the offset projection on the corner post extends into the rabbet of the door. This not only provides for a neater external appearance of the door, but also avoids the necessity to make the window frame so wide that it will produce an unnecessarily wide blind spot.

As will be seen in Fig. 1, the window 19 is shaped somewhat like the window shown in my Patent 1,671,433, having a rearwardly inclined front edge, the inclination being somewhat less than that of the frame 17 and the window guide 20 being cut in that portion of the window frame outside of the rabbeted portion. It will be understood that the operating mechanism for the windows may be similar to that disclosed in my aforesaid patent or of any other suitable design. Such mechanism forms no part of the present invention and may be varied considerably.

Referring to the upper part of Fig. 1, the usual front and rear headers 21 and 22 extend across the space between the corner posts 11 below the roof of the body and are separated so that the windshield glass can slide upwardly between them. In this example, the rear header 22 is secured to the offset projections 15 on the corner posts, and when the door is closed, the window frame 17 conceals the outer ends of this header.

Obviously, the front doors may be hinged at the front or rear edges depending upon the desire of the manufacturer. By way of illustration, the front doors are shown as being hinged at their front edges to the corner posts and to the sides of the body. To avoid the necessity of having a strap hinge project upwardly of the corner posts, the upper strap hinge 23 shown in dotted lines in Fig. 1, is shown as being secured to the upper portion of the corner post and the other two hinges are alined with it at a slight inclination, the lower hinge being wider than the upper hinge to secure the proper alinement. Obviously, the hinge pins may be brought into vertical alinement by utilizing hinges of the type shown in my aforesaid patent. This is a feature that may be widely varied to suit the demands of body manufacturer.

Referring now to the embodiment of the invention shown in Figs. 4 to 7 inclusive, the non-glare windshield assembly is illustrated as being applied to a body 10' having the usual vertical corner posts 11', this being one of the most common body designs. Herein, the windshield glass 12' is slanted across the inner faces of the corner posts and these corner posts present offset projections 15' of greater width than those shown in the embodiment in Fig. 1. In other words, the non-glare slant is provided entirely by the slanted or rearwardly inclined grooves 13' and tracks 14'.

In Fig. 6, the upper ends of the window grooves are located entirely within the offset projections 15'. In this installation, the window frame 17' of the door 18' is also rabbeted at its upper edge on the inside as shown best at 16' in Fig. 5, to receive the offset projections 15'. The front and rear headers 21' and 22' extend across the front somewhat rearwardly of the upper main body portions of the corner posts being secured to or abutting the offset projections 15' at the top. As will be noted in Fig. 4, the rear header 22' is visible near its lower end through the window opening. To provide a neat appearance, the inner face of this header may be beveled as shown at B in Fig. 6, so that the extreme end is approximately flush with the rear edge of the projections 15'. In this example, as well as in Fig. 1, the curves at the upper front corners of the window frames are enlarged or made on greater radii of curvature than those at the other corners in order to conceal as much as is practicable of the ends of the header without sacrificing too much in the appearance. In some instances it is contemplated that the beveled end portions may be eliminated and the square ends entirely concealed by the window frame but where dimensions are as small as possible it is desirable to employ both the beveled header ends and the enlarged curves.

In this example, the door jamb and its hinges are vertical and the window glass 19' is rectangular or has front and rear vertical edges working in vertical tracks, thus obviating the necessity to employ a special glass and more or less complex window operating mechanism. In fact, very little change in the conventional design of closed body is required to provide a non-glare windshield.

While a number of different examples of the non-glare windshield and clear vision fronts could be shown on bodies of different styles, it is believed that the selected embodiments are adequate to illustrate the inventive idea. Any experienced body designer can apply the idea without making expensive alterations in the corner posts or pillars and doors, including the headers. Moreover, it can be applied to both the sliding and the tilting types of windshields now in general use.

From the foregoing description, it will be seen that the improved non-glare and clear vision front has many advantages. The slant of the windshield across the inner faces of the corner posts or pillars makes it possible to avoid prohibitive inclinations of the pillars, and enables the door joints or the jambs to be made more nearly vertical and consequently, the hinge pins as nearly vertical as possible where the pillars are inclined slightly and without increasing the width of the corner assemblies. In conjunction with the window assembly covered in my aforesaid patent, the inventive idea can be applied to any body having slanting pillars. Moreover, it enables a non-glare windshield to be applied to a body having vertical pillars.

Obviously, the present invention is not restricted to the particular embodiment thereof herein shown and described. Moreover, it is not indispensible that all the features of the invention be used conjointly, since they may be employed advantageously in various combinations and sub-combinations.

What is claimed is:

1. In a closed automobile body of the class described, pillars of substantially uniform outside width presenting glass receiving tracks slanting upwardly and rearwardly across the inner faces of the pillars; a windshield supported in said tracks; and offset projections on the inner rear edges of the pillars into which the tracks extend.

2. In a closed automobile body of the class described, pillars presenting glass receiving tracks slanting upwardly and rearwardly across the inner faces of the pillars; a windshield supported in said tracks; offset projections on the rear faces of the pillars into which the tracks extend; and doors having front rabbeted edges to receive said offset projections.

3. In a closed automobile body of the class described, pillars presenting glass receiving tracks slanting upwardly and rearwardly across the inner faces of the pillars; a windshield supported in said tracks; offset projections on the rear faces of the pillars into which the tracks extend; front and rear headers connected to the upper ends of the pillars, the rear face of the rear header being substantially flush with the rear edge of the offset projection.

4. In a closed automobile body of the character described, having substantially vertical pillars, a slanting windshield between the pillars; upwardly and rearwardly inclined offset projections on the rear faces of the pillars at the inside edges and window frames having rabbets at their forward upper edges to receive said offset projections, the arrangement being such as to reduce the combined width of the pillars and window frames to a minimum.

5. In a closed automobile body having substantially vertical front corner posts or pillars, a windshield slanted across the inner faces of said pillars; inclined tracks in the pillars for the windshield glass; upwardly and rearwardly inclined, offset projections on the rear faces of the pillars to provide the tracks at the upper portions thereof; front and rear headers connected to said pillars, the rear header being beveled on its rear face at the ends so that its ends lie substantially flush with the rear edges of said offset projections; and window frames presenting substantially vertical front edges hinged to said pillars and having inclined rabbets at their upper end portions to fit against said offset projections.

6. In a closed automobile body having substantially vertical front corner posts or pillars, a windshield slanted upwardly and rearwardly across the inner faces of said pillars; inclined tracks in the pillars for the windshield glass; upwardly and rearwardly inclined, offset projections on the rear inner faces of the pillars to provide the tracks at the upper portions thereof; and front and rear headers connected to said pillars, the upper, front corner portions of the window openings in the doors being curved on relatively large radii of curvature to conceal the lower end edges of the rear header.

In testimony, that I claim the foregoing as my own, I have hereto affixed my signature.

JOSIAH W. McADAM.